United States Patent [19]

Cucinotta et al.

[11] Patent Number: 4,709,797
[45] Date of Patent: Dec. 1, 1987

[54] CLUTCH DRIVEN PLATE

[75] Inventors: Luigi Cucinotta; Orazio Di Benedetto, both of Milan, Italy

[73] Assignee: Automotive Products plc, Leamington Spa, England

[21] Appl. No.: 905,534

[22] Filed: Sep. 10, 1986

[30] Foreign Application Priority Data

Sep. 18, 1985 [IT] Italy .............................. 22175 A/85

[51] Int. Cl.⁴ ........................... F16D 3/14; F16D 3/64
[52] U.S. Cl. ............... 192/106.2; 192/70.17; 192/106.1; 464/68
[58] Field of Search ............... 192/106.2, 106.1, 70.17, 192/30 V; 464/66, 68, 160, 45, 46

[56]  References Cited

U.S. PATENT DOCUMENTS

| 3,802,541 | 4/1974 | Schneider | 192/106.1 |
| 4,088,212 | 5/1978 | Brown | 192/106.2 |
| 4,234,068 | 11/1980 | Le Brise | 192/106.2 |
| 4,453,838 | 6/1984 | Loizeau | 192/106.2 X |
| 4,470,494 | 9/1984 | Takeuchi | 192/106.2 |
| 4,537,296 | 8/1985 | Lech, Jr. et al. | 192/106.2 |
| 4,548,302 | 10/1985 | Lech, Jr. et al. | 192/106.2 |
| 4,556,136 | 12/1985 | Lech, Jr. | 192/106.2 |
| 4,570,774 | 2/1986 | Loizeau | 192/106.2 |
| 4,634,398 | 1/1987 | Alas | 464/68 |

Primary Examiner—Rodney H. Bonck
Assistant Examiner—Richard M. Lorence
Attorney, Agent, or Firm—Solon B. Kemon

[57]  ABSTRACT

A friction clutch driven plate for rotation about a central axis and having an intermediate disc with a central opening lined by axial splines to engage external splines on a rotary motion output shaft. A first annulus co-axial with the intermediate disc has axial projections which key into bores in the disc so the annulus and disc rotate in synchronism. On the other side of the intermediate disc and co-axial therewith is a second annulus. The disc has axial projections keying into notches in the inner periphery of the second annulus so the latter also rotates in synchronism with the disc. A carrier carrying annular friction facings comprises first and second axially spaced plate arrangements between which are sandwiched the intermediate disc and the annuli. There is some allowance for relative rotary motion between the carrier and the intermediate disc against torsion damping springs. During that relative motion radial sides of the first and second plate arrangements rub on a radial side of a radial lip on the first and second annuli respectively, giving an hysteresis effect.

11 Claims, 9 Drawing Figures

CLUTCH DRIVEN PLATE

BACKGROUND OF THE INVENTION

This invention concerns a clutch driven plate.

A clutch in which the driven plate may be used may be, for example, a clutch of a motor vehicle in which drive from the engine is transmitted to the road wheels via a transmission including the clutch.

The clutch may be a diaphragm spring clutch.

An object of the invention is to provide a clutch driven plate of a construction which may have relatively few component parts and which may be relatively easy to make, and may allow a reduction of manufacturing costs.

SUMMARY OF THE INVENTION

According to the invention there is provided a driven plate for a clutch, said driven plate being intended for rotation about an axis, the driven plate comprising first and second annuli and an intermediate disc disposed between the annuli and having a central opening centred on said axis and lined by axial splines, the disc being intended for rotation about said axis and the annuli disc being keyed together by plug and socket connections whereby the annuli and disc rotate in synchronism, a friction material carrier comprising first and second axially spaced plate arrangements fast one with the other for rotation in synchronism about said axis, said intermediate disc being disposed between the first and second plate arrangements contacting the first and second annuli respectively, friction material in annular array being mounted on said carrier and disposed radially outwardly of the annuli, rotary motion about said axis being transmissible from the carrier to the intermediate disc and vice-versa, the carrier and the intermediate disc being capable of limited angular movement relative one to another about said axis against action of resilient torsion damping means between the disc and carrier, and wherein said carrier rubs on said annuli during said relative angular movement.

At least one of the plug and socket connections between a said annulus and the intermediate disc may comprise a projection or pin on one engaging in a void in the other.

Preferably a said plate arrangement contacts a radial side of the respective annulus. The annulus can be pressed against the plate arrangement by resilient means between the intermediate disc and that annulus so urging the carrier axially that the other plate arrangement is pressed against the other annulus.

A said annulus having a radial side in contact with the respective plate arrangement may extend axially away from the intermediate disc and in a central opening of the plate arrangement.

BRIEF DESCRIPTION OF THE DRAWINGS

The invention will now be further described, by way of example, with reference to the accompanying drawings in which.

DETAILED DESCRIPTION OF EMBODIMENTS

Figure 1:
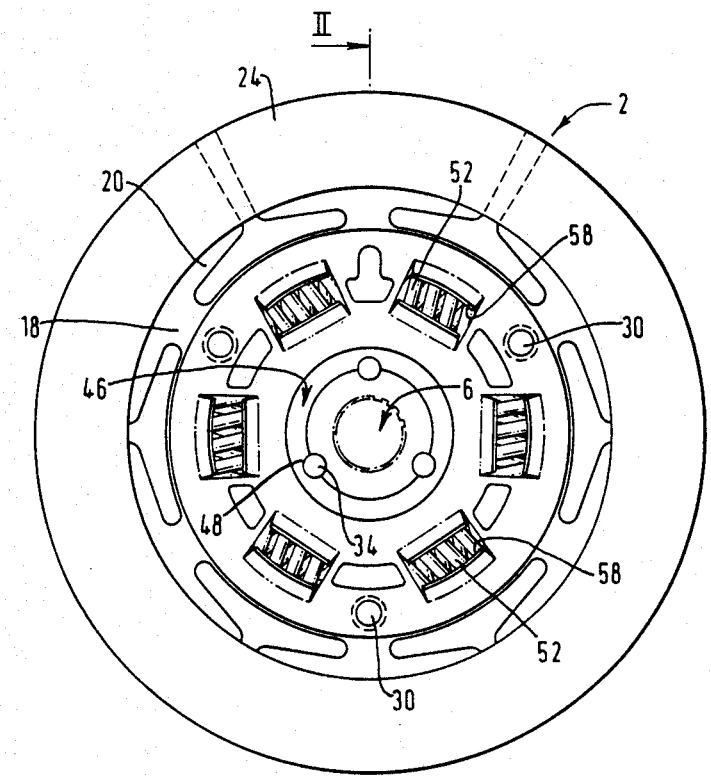
FIG. 1 is a plan view (in the direction of arrow I in FIG. 2) of a driven plate for a clutch, formed according to this invention.
Figure 8:
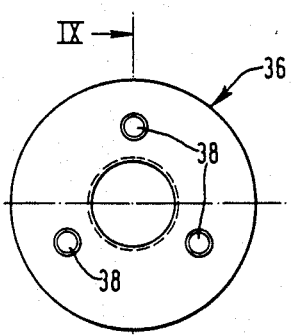
FIG. 8 is a plan view, on an enlarged scale, of the other annulus in FIG. 1.
Figure 9:
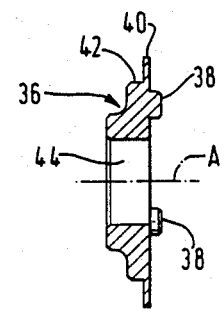
FIG. 9 is a section on line IX—IX in FIG. 8.
Figure 2:
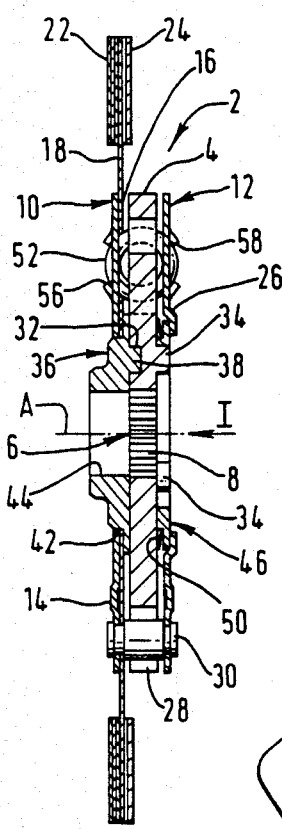
FIG. 2 is a section on line II—II in FIG. 1.
Figure 3:
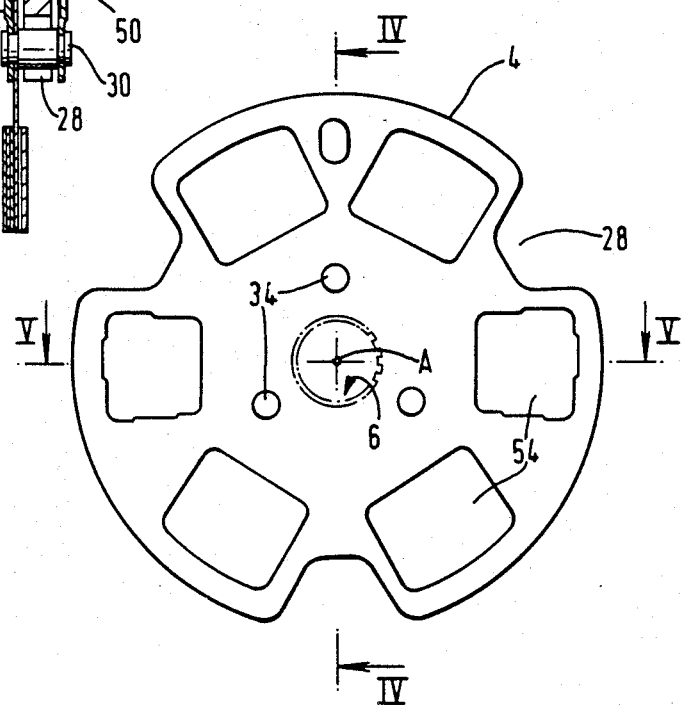
FIG. 3 is a plan view on an enlarged scale of the intermediate disc in FIG. 1.
Figure 4:
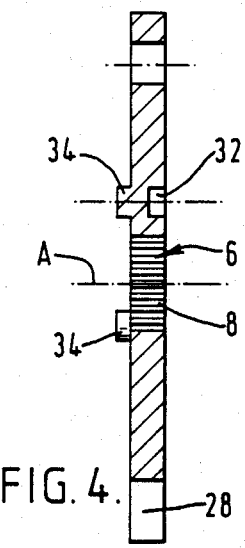
FIGS. 4 and 5 are respectively sections on lines IV—IV and V—V in FIG. 3.
Figure 5:
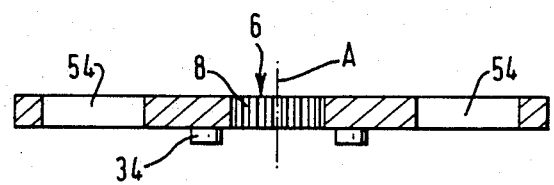
Figures 6, 7:
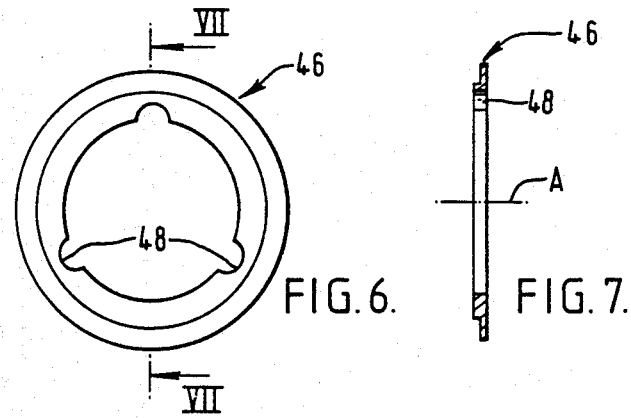
FIG. 6 is an inverse plan view, on an enlarged scale, of one of the annuli in FIG. 1.
FIG. 7 is a section on line VII—VII in FIG. 6.

The clutch driven plate 2 in the drawings is intended to rotate about an axis A. The driven plate comprises an intermediate disc 4 with a central aperture 6 lined by axial splines 8 for mating (when the drive plate is in use in a clutch) with axial splines on a shaft (not shown) which receives rotary motion output from the driven plate when the engaged clutch (not shown) is receiving rotary motion input from a source of rotary motion.

The intermediate disc 4 is flanked on either side by a plate arrangement 10 and a plate arrangement 12. The plate arrangement 10 comprises a centrally appertured disc-shaped side-plate 14 and a centrally apertured generally disc-shaped plate 16 formed radially outwardly with spokes 18 bearing circumferentially spaced segments 20. Annular friction facings 22 and 24 are secured, for example, by adhesive to the segments 20. The plate arrangement 12 is a centrally apertured disc-shaped side-plate having an axially stepped shoulder 26 at its inner periphery.

In its outer periphery the intermediate disc 4 has a plurality of generally V-shaped notches 28 each accepting a respective stop rivet 30. The stop rivets 30 firmly secure the plates 14 and 16 together to which the rivets also firmly secure the side plate 12 so that the riveted plates 12, 14 and 16 form a one-piece carrier for the friction facings 22, 24.

On one side, the intermediate disc 4 is formed with spaced, cylindrical blind bores or sockets 32 each the same distance from axis A and substantially equi-angularly spaced thereabout. On the other side of the disc 4, and coinciding with the sockets 32, is a plurality of cylindrical, projecting pins or plugs 34 integral with the disc.

An annulus 36 is integrally formed with a plurality of projecting cylindrical pins or plugs 38 which fit into the sockets 32 thereby keying the annulus 36 and disc 4 together for synchronous rotation. Annulus 36 has a radially extending outer circumferential lip 40 having a radial side face in contact with a radially inner portion of a radial side face of the plate 16 of the arrangement 10. Also the central opening in the plate arrangement 10 is a relatively close but sliding fit on a substantially cylindrical axial shoulder 42 on the annulus 36 so that the annulus serves to hold the arrangement 10 in proper position. Central opening 44 through the annulus 36 has a diameter substantially equal to the root circle of the splines 8. Therefore the annulus 36 will just fit over the splines on the aforesaid output shaft and will assist in maintaining the axis A of the driven plate 2 substantially in coincidence with the axis of the output shaft, i.e. any tendency for the driven plate to sit skew on the output shaft will be avoided or at least will be reduced.

If desired the opening 44 of the annlus 36 can be lined with axially extending splines aligned with and substantially similar to the splines 8 on the intermediate disc 4. The splines on the annulus 36 also mate with the axial splines on the aforesaid shaft and serve to hold the annulus centrally of the driven plate 2. It is known that the tip circle or envelope of the shaft splines can, due to manufacturing tolerances, vary from one supposedly similar said shaft to another. If the tip circle of the splines on one such shaft is of particularly small radius there is a risk that a non-splined annulus 36 could skew about and relative movement between the annulus 36 and the plates 14, 18 could cause severe wear or scoring of the shoulder 42. The risk of this can be reduced by providing annulus 36 with splines as described.

Another annulus 46 of an L-shaped cross-section is housed between the disc 4 and the side-plate 12 within the dish shape formed by shoulder 26. Substantially semi-cylindrical notches 48 in the inner periphery of annulus 46 provide sockets engaged by the plugs 34 thereby keying the annulus 46 and intermediate disc 4 together for synchronous rotation.

A Belleville spring washer 50 in the cavity between the L-shaped annulus 46 and the disc 4 axially urges each thereby pressing a radial side face of that annulus against a radially inner portion of a radial side face portion of the plate 12. By reaction through the disc 4 and rivets 30 the plate arrangement 10 is also pressed against the lip 40.

In a manner broadly comparable to previously known driven plates, the driven plate 2 is provided with a circumferential array of torsional vibration damping springs 52 each disposed in a respective window 54 in the intermediate disc 4 and adjacent windows 56 and 58 in the plate arrangements 10 and 12. Accordingly the carrier 10, 12 and the disc 4 can move angularly relatively one to another against the action of the springs 52, the extent of this relative movement being limited by the stop rivets contacting the sides of the notches 28.

It will be appreciated that when assembling the driven plate 2, the annuli 36, 46, the Belleville 50 and the springs 52 are initially positioned with the disc 4 before the plate arrangements 10 and 12 are positioned and riveted together.

If desired the annulus 36 and/or the annulus 46 and/or the intermediate disc 4 can be of a tough plastics material.

Either or both the lip 40 and the annulus 46 can act as a friction washer to create an hysteresis effect whereby transmission of torque from the carrier arrangement 10, 12 to the intermediate disc 4 is a function of the angular position of the carrier arrangement relative to the intermediate disc and for a given relative angular position the torque transmitted to the intermediate disc from the carrier arrangement is greater when the developed torque applied to the carrier arrangement is increasing than when the developed torque is decreasing.

We claim:

1. A driven plate for a clutch, said driven plate being rotatable about an axis of rotation, said driven plate comprising first and second annuli and an intermediate disc disposed between the annuli, said disc having a central opening centered on said axis, said opening being lined by axial splines, said disc being rotatable about said axis, said annuli and disc being keyed together by plug and socket connections whereby the annuli and disc rotate in synchronism, a friction material carrier comprising a first plate arrangement and a second plate arrangement, said first plate arrangement being axially spaced from said second plate arrangement, said first and second plate arrangements being fast one with the other for rotation in synchronism about said axis, said intermediate disc being disposed between the first and second plate arrangements, said first and second plate arrangements being in contact with the first and second annuli respectively, said first annulus being disposed between the first plate arrangement and the disc and said second annulus being disposed between the second plate arrangement and said disc, said first plate arrangement having a central opening in which the first annulus extends axially away from said disc, friction material in annular array being mounted on said carrier and disposed radially outwardly of the annuli, rotary motion about said axis being transmissible from the carrier to the intermediate disc and vice-versa, the carrier and the intermediate disc being capable of limited angular movement one relative to the other about said axis against action of resilient torsion damping means between the disc and carrier, and wherein said carrier rubs on said annuli during said relative angular movement.

2. A driven plate according to claim 1, wherein a said plug and socket connection between a said annulus and the intermediate disc comprises one of said annulus and disc having a void in which a projection on the other of said annulus and disc engages.

3. A driven plate according to claim 2, wherein said intermediate disc has at least one bore and said first annulus comprises at least one projection engaging in said bore.

4. A driven plate according to claim 2, wherein said second annulus has at least one void, and said intermediate disc comprises at least one projection engaging in said void.

5. A driven plate according to claim 4, wherein said void is a notch in an inner periphery of the second annulus.

6. A driven plate according to claim 1, wherein a said plate arrangement contacts a side of the respective annulus, and said side extends radially with respect to said axis of rotation.

7. A driven plate according to claim 6, wherein said second annulus is pressed against said second plate arrangement by resilient means between the intermediate disc and said second annulus so urging the carrier axially that said first plate arrangement is pressed against said first annulus.

8. A driven plate according to claim 6, wherein a said annulus comprises a radially outer lip contacting the respective plate arrangement.

9. A driven plate according to claim 1, wherein said first annulus has a central opening substantially centered on said axis and of a diameter substantially equal to a root circle of said splines on said intermediate disc.

10. A driven plate according to claim 1, wherein at least one of said annuli and the intermediate disc is formed of plastics material.

11. A clutch including a driven plate according to claim 1.

* * * * *